United States Patent
Balajadia

[19]

[11] Patent Number: 6,024,368
[45] Date of Patent: Feb. 15, 2000

[54] IN LINE TRICYCLE

[76] Inventor: Jose P. Balajadia, 61-15 98 St. Apt. 3J, Rego Park, N.Y. 11374

[21] Appl. No.: 08/889,980

[22] Filed: Jul. 10, 1997

[51] Int. Cl.$^7$ ..................................................... B62K 5/00
[52] U.S. Cl. ........................................... 280/239; 280/261
[58] Field of Search ................................... 280/239, 259, 280/260, 261

[56] References Cited

U.S. PATENT DOCUMENTS

| | | | |
|---|---|---|---|
| 616,481 | 12/1898 | Miehle | 280/239 |
| 1,360,032 | 11/1920 | Schiffner | 280/239 |
| 1,380,082 | 5/1921 | Schleder | 280/239 |
| 1,535,714 | 4/1925 | Burke | 280/239 |
| 3,964,325 | 6/1976 | Rogers | 74/219 |
| 4,028,964 | 6/1977 | Jones | 74/606 R |
| 4,445,702 | 5/1984 | Reyes | 280/239 |
| 4,458,908 | 7/1984 | Strong | 280/239 |
| 4,688,816 | 8/1987 | Yang | 280/239 |
| 4,826,191 | 5/1989 | Matre et al. | 280/261 |
| 5,002,296 | 3/1991 | Chiu | 280/260 |
| 5,102,155 | 4/1992 | Chou | 280/236 |
| 5,209,507 | 5/1993 | Domenge | 280/231 |

OTHER PUBLICATIONS

Glenn's Complete Bicycle Manual=–1973 by Clarence W. Coles and Harold Glenn pp. 105–110.
Richard's Bicycle Repair Manual 1994 by Richar Ballantine and Richard Grant pp. 10,11,54,55.
The Bicycle Repair Book 1985 by Rob Van der Plas pp. 52,53.
Bicycling Magazine's Complete Guide to Bicycle Maintenance and Repair 1994 by Rodale Press,Emmaus,Pennsylvania pp. 2–6.
Glenn's New Complete Bicycle Manual 1987 by Crown Publishers, Inc., p. 123.

*Primary Examiner*—Kevin Hurley
*Assistant Examiner*—Andrew J. Fischer

[57] ABSTRACT

The in line tricycle has a horizontal frame (34) having three wheels in line namely: a front wheel (20), an inner rear wheel (24), and an outer rear wheel (26); a chainwheel (22) and its adjuncts mounted thereunder. A modified freewheel is attached to the hub of the inner rear wheel (24) while a regular freewheel is attached to the hub of the outer rear wheel (26).

1 Claim, 5 Drawing Sheets

FREEWHEEL - PRIOR ART

MODIFIED FREEWHEEL

PRIOR ART-BICYCLE

IN LINE TRICYCLE

BACKGROUND OF THE INVENTION

This invention relates to bicycles specifically to an in line tricycle which has a modified freewheel.

Originally bicycles were made with a fixed transmission ration. This limited their efficiency and makes it difficult to pick up speed and can be too tiring to maintain top speeds for prolonged periods of time.

The bicycle has only two wheels although they are in line. The tricycle usually has three wheels but they are not usually all in line.

Freewheels are attached to rear wheel of bicycles. Its purpose is to connect the rear wheel to the chainwheel by means of a chain so that the chainwheel can rotate the wheel.

The freewheel has a circular freewheel body with a threaded hole at the center. It has a rotating drum having a single gear integral to it, rotating together at the same time around the circumference of the freewheel body. When viewed from the right in a counterclockwise direction, the rotating drum rotates freely. In a clockwise direction, the pawls catch in the ratchets so that the rotating drum takes with it the freewheel body thus spinning the rear wheel to roll forward.

BRIEF SUMMARY OF THE INVENTION

A tricycle that has three wheels in line namely: a front wheel, an inner rear wheel, and an outer rear wheel. The three wheels provide traction and stability to the vehicle. The modified freewheel greatly increases the rotation of the outer rear gear with one revolution of the chainwheel.

DETAILED DESCRIPTION OF THE INVENTION

Figure 1:
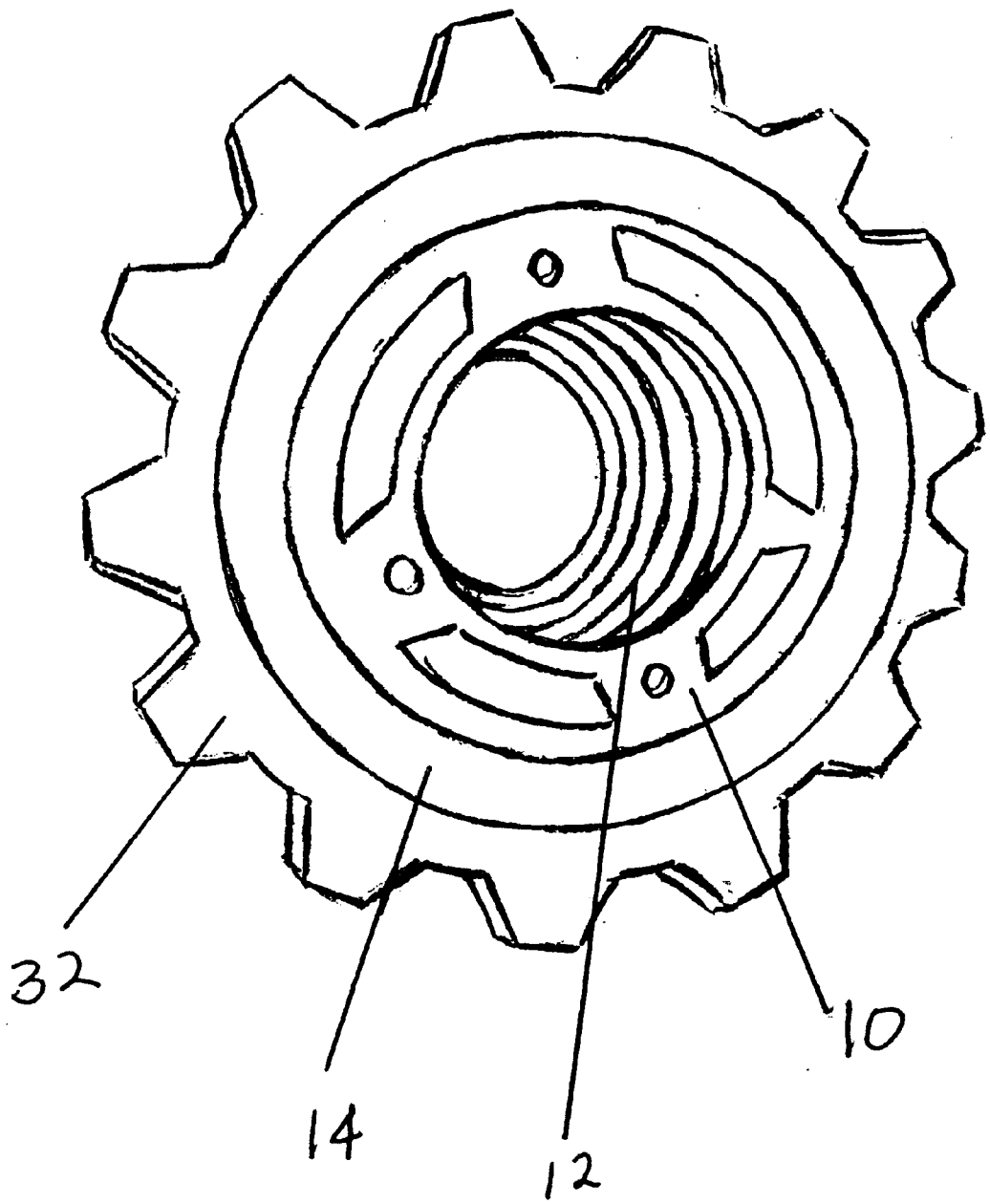
FIG. 1 is a perspective of a freewheel of the prior art.
Figure 2:
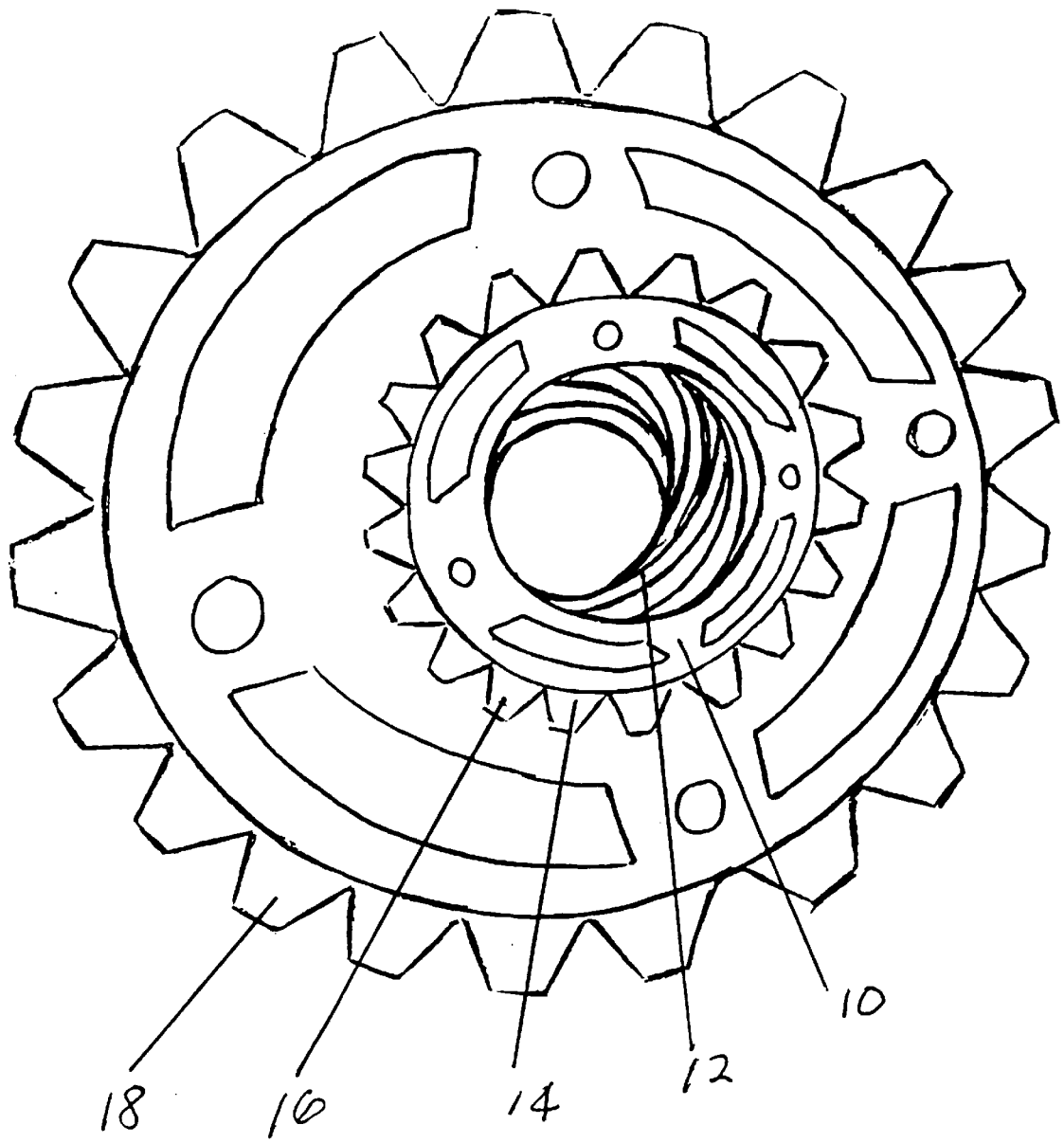
FIG. 2 is a perspective of a modified freewheel.
Figure 3:
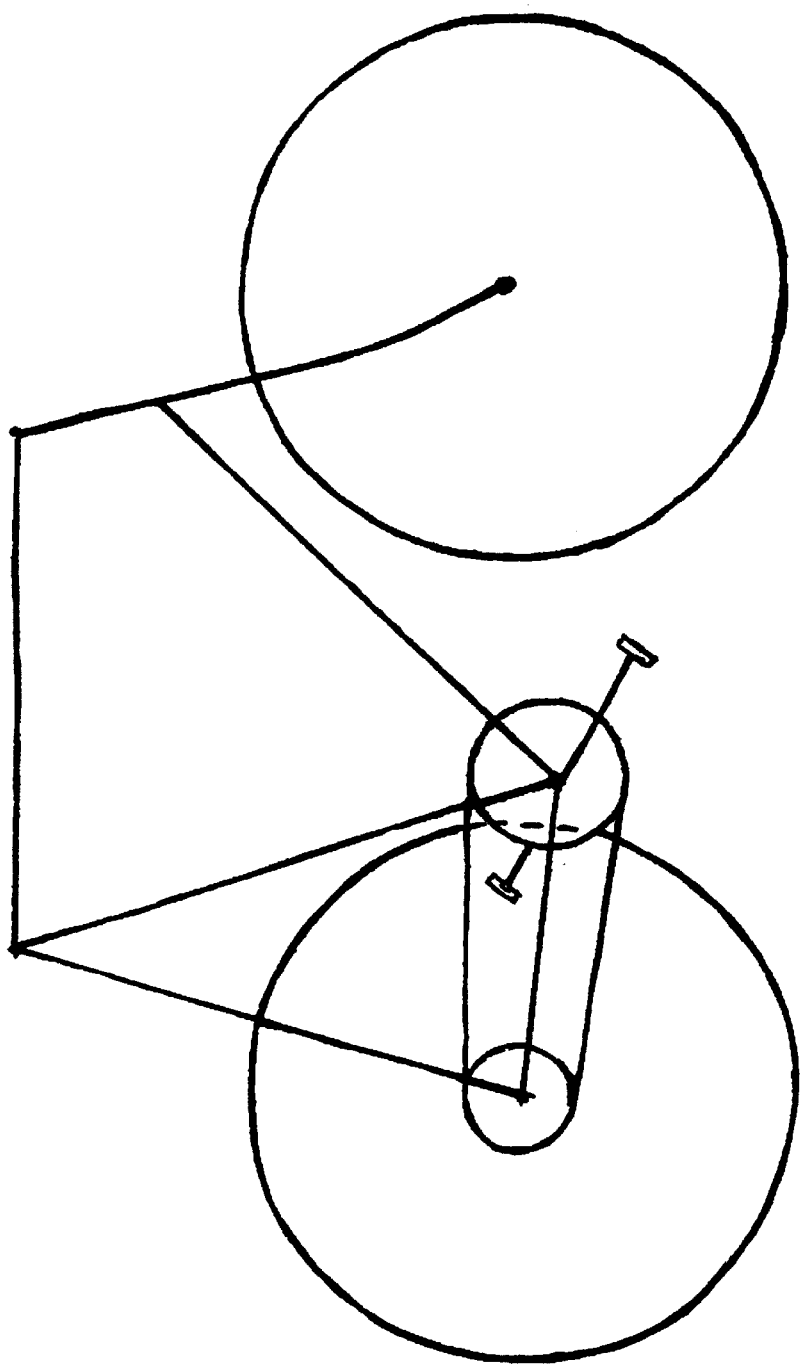
FIG. 3 is a side view of a prior art bicycle.
Figure 4:
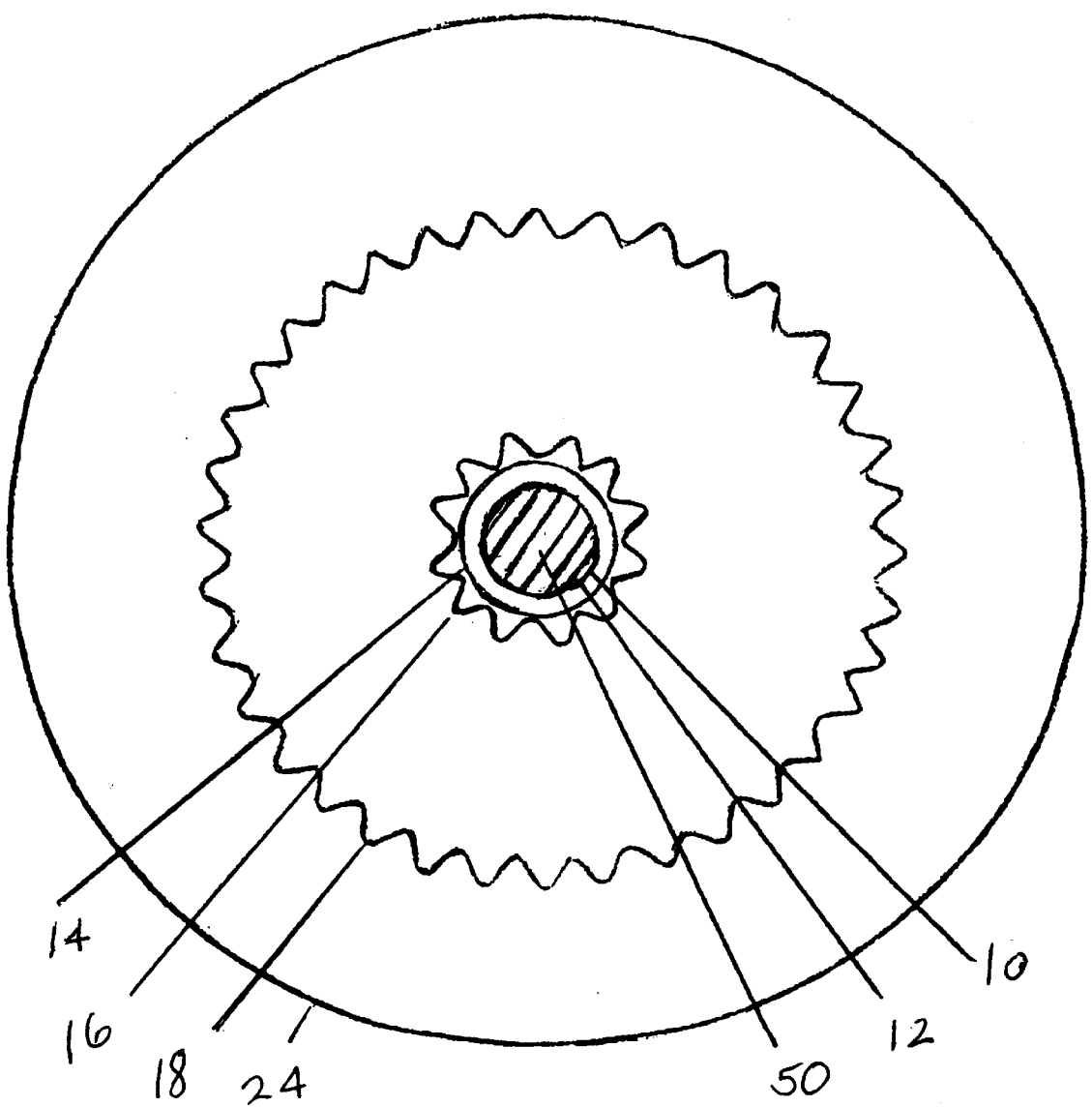
FIG. 4 is a side view of an inner rear wheel of an in line tricycle with a modified freewheel attached to its hub.
Figure 5:
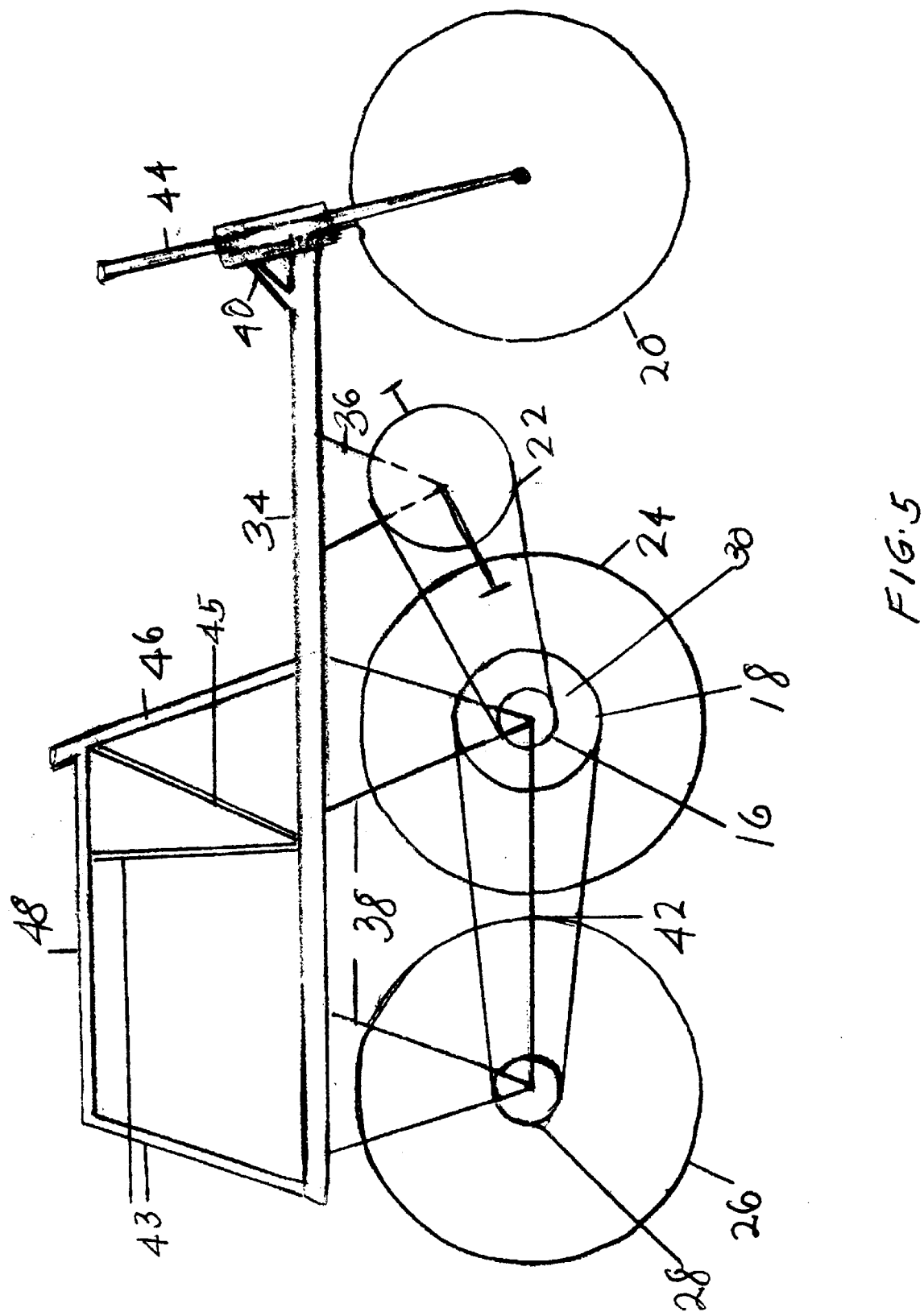
FIG. 5 is a side view of the in line tricycle.

The in line tricycle has a horizontal frame (34) having three wheels in line namely: a front wheel (20), an inner rear wheel (24), and an outer rear wheel (26) mounted thereunder, and a chainwheel (22). At one end of the horizontal frame (34) and a down tube (40) which hold the head tube in place. The vee tubes (36) which are attached under the horizontal frame (34) hold the chainwheel (22) and its adjuncts in place. The frame stays (38) which are attached to the underside of the horizontal frame (34), hold in place the inner rear wheel (24) and the outer rear wheel (26) at their axles. The tie bars (42) hold both wheels together at their axles in order to strengthen their structures. The seat tube (46) is mounted on top of the horizontal frame (34). The passenger seat (48) is mounted on top of the horizontal frame (34) behind the seat tube (46). A first freewheel which is a modified freewheel(30) is attached to the hub of the inner rear wheel (24) while a second freewheel(28), a known freewheel is attached to the hub of the outer rear wheel (26).

The first freewheel is used for converting and increasing the chainwheel's (22) rotational output of an in line tricycle. It has a circular freewheel body (10) with a threaded hole (12) at the center. It has a rotating drum (14) having two gears integral to it namely: a small sprocket (16) and a large sprocket (18), rotating together at the same time around the circumference of the freewheel body (10). In the counter-clockwise direction, the rotating drum (14) can rotate freely because the pawls ride over the ratchets. In the clockwise direction, the pawls catch in the ratchets so that the rotating drum (14) takes with it the freewheel body (10) thus spinning the inner rear wheel (24) to roll forward.

Two separate chains are used to interconnect. A first chain connects the chainwheel (22) to the small sprocket (16) while a second chain connects the outer rear wheel gear (28) to the large sprocket (18).

When the pedals are pushed, the chainwheel (22) rotates. Chainwheel (22) in turn rotates the small gear (16) an the large gear (18) at the same time. Large gear (18) in turn rotates the outer rear wheel gear (28).

The following are the number of gear teeth:

(a) chainwheel—54

(b) large gear—54

(c) small gear—18

(d) outer rear wheel gear—18

The following are gear ratios:

1. chainwheel to small sprocket is 54/18=3

2. chainwheel to outer rear wheel gear is 54/18=3

3. large sprocket to small sprocket is 54/18

4. large sprocket to outer rear wheel gear is 54/18=3

When the chainwheel rotates the small sprocket (16) it imparts the equivalent of 3 rotations to it which is equal to their gear ratio. Since the small sprocket (16) and the large sprocket (18) both rotate at the same time, then the large sprocket (18) is also rotating 3 times. Therefore, the large gear (18) will impart to the outer rear wheel gear (28) 3 times their gear ratio which come up to 3×3=9 rotations.

In other words, one revolution of the chainwheel will impart the outer rear wheel gear 9 rotations instead of the usual 3 rotations.

The in line tricycle is better than a bicycle because of two main reasons namely: (1) the three wheels carry the load and (2) the modified freewheel gives the rear wheel more rotations than that of a bicycle.

I claim:

1. A three wheeled vehicle comprising:

a substantially horizontal frame;

a front wheel, an inner rear wheel, and an outer rear wheel, wherein the three wheels are in line with each other;

the front wheel being steerably connected to the frame's front end, the outer rear wheel connected to the frame's rear end and the inner rear wheel located and connected to the frame between the front wheel and the outer rear wheel;

a chainwheel having foot pedals, the chainwheel located and connected to the frame in front of the inner rear wheel;

a small sprocket and a large sprocket each fixedly mounted in a concentric manner about each other, wherein both sprockets are concentrically mounted to the inner rear wheel via a first freewheel;

an outer rear wheel gear concentrically mounted to the outer rear wheel via a second freewheel;

a first chain connecting the chainwheel to the small sprocket and a second chain connecting the large sprocket to the outer rear wheel gear.

* * * * *